(12) United States Patent
Zaggia et al.

(10) Patent No.: US 8,153,214 B2
(45) Date of Patent: Apr. 10, 2012

(54) MULTILAYER LAMINATED FILM FOR PACKAGES

(75) Inventors: Carlo Alberto Zaggia, Vicenza (IT); Noemi Bertolino, Verona (IT)

(73) Assignee: Alcan Packaging Italia S.r.l., Lugo di Vicenza (IT)

( * ) Notice: Subject to any disclaimer, the term of this patent is extended or adjusted under 35 U.S.C. 154(b) by 7 days.

(21) Appl. No.: 11/667,708

(22) PCT Filed: Sep. 8, 2005

(86) PCT No.: PCT/EP2005/054441
§ 371 (c)(1),
(2), (4) Date: May 14, 2007

(87) PCT Pub. No.: WO2006/056495
PCT Pub. Date: Jun. 1, 2006

(65) Prior Publication Data
US 2007/0297702 A1 Dec. 27, 2007

(30) Foreign Application Priority Data
Nov. 29, 2004 (IT) .............................. PD2004A0302

(51) Int. Cl.
*B32B 1/02* (2006.01)
*B32B 1/08* (2006.01)

(52) U.S. Cl. ............... 428/34.2; 428/34.1; 428/35.7; 428/35.9; 428/36.9; 428/36.91

(58) Field of Classification Search ............. 428/34.1, 428/34.2, 35.7, 35.9, 36.9, 36.91
See application file for complete search history.

(56) References Cited

U.S. PATENT DOCUMENTS

| | | | |
|---|---|---|---|
| 3,194,479 A * | 7/1965 | Rumberger | 229/123.2 |
| 4,762,514 A | 8/1988 | Yoshida | |
| 4,903,841 A | 2/1990 | Ohsima et al. | |
| 5,001,325 A | 3/1991 | Huizinga | |
| 5,312,659 A | 5/1994 | Otsuka et al. | |
| 5,630,308 A | 5/1997 | Guckenberger | |
| 7,118,792 B2 * | 10/2006 | Hewitt et al. | 428/100 |

(Continued)

FOREIGN PATENT DOCUMENTS

EP 0 363 540 A 4/1990
(Continued)

OTHER PUBLICATIONS

Mylar—Physical-Thermal Properties; Product information.
(Continued)

*Primary Examiner* — Marc Patterson
(74) *Attorney, Agent, or Firm* — Modiano & Associati; Albert Josif; Daniel O'Byrne

(57) ABSTRACT

A multilayer laminated film for packages, constituted by a first layer made of plastic material and by at least one second layer made of material chosen among plastic material, metallic material, paper-like material or equivalent materials; each layer is coupled to the adjacent layer by means of an intercalated layer of adhesive material. The multilayer laminated film has, on at least one face of the more rigid layer of plastic material, a plurality of continuous, parallel, side-by-side incisions, which are adapted to facilitate a reduction of the breaking load at right angles to the direction of the incisions. The incisions are obtained by removing material and affect only partially the thickness of the more rigid layer.

15 Claims, 3 Drawing Sheets

U.S. PATENT DOCUMENTS

| | | |
|---|---|---|
| 2001/0038895 A1 | 11/2001 | Moteki et al. |
| 2005/0084636 A1 | 4/2005 | Papenfuss et al. |

FOREIGN PATENT DOCUMENTS

| | | |
|---|---|---|
| EP | 0 468 619 B1 | 1/1992 |
| EP | 0 345 930 B1 | 4/1992 |
| EP | 0 596 747 A | 5/1994 |
| EP | 0 596 747 A1 | 5/1994 |
| JP | S57-202966 | 12/1982 |
| JP | 2002-002790 | 1/2002 |
| JP | 2003-137341 | 5/2003 |

OTHER PUBLICATIONS

Toppan Printing Co., Ltd—Specification of GL-AE Film; Aug. 24, 1999.

Honeywell Inc—Capran Medallion Biaxially Oriented Nylon Films; p. 2 of 2; Aug. 14, 2003; USA.

Dupont Electronics—Mylar Type A, Polyester Film; Thickness Range 12-50μm.

Filmon BX; Physical Properties.

\* cited by examiner

MULTILAYER LAMINATED FILM FOR PACKAGES

TECHNICAL FIELD

The present invention relates to a multilayer laminated film for packages.

The present invention also relates to a package provided by means of a multilayer laminated film according to the invention.

BACKGROUND ART

Easy-open wrappers are increasingly widespread, especially but not exclusively in the field of food, because of their practicality from the point of view of the user and because of their low cost from the point of view of the manufacturer.

These wrappers are generally obtained by folding and sealing in various manners laminated films composed of multiple layers.

Such multilayer laminated films have regions that are preset for tearing, which form so-called "easy openings" when the wrapper is packaged.

There are various kinds of film provided with regions preset for tearing.

A first type is constituted by multilayer films comprising a first external layer made of plastic material bonded to a second underlying layer made of metallic material, generally aluminum.

The first layer has a plurality of continuous and parallel incisions, which guide the tearing process, and are obtained by laser or ultrasound treatment, and pass through all of said first layer and stop at the second layer, which as mentioned is generally made of aluminum.

However, these through incisions are detrimental to the underlying aluminum, since they expose it to the moisture of the environment and therefore to rapid deterioration, which can be fatal for the integrity of the product contained in the wrapper constituted with this first type of film.

Further, in order to achieve good laser treatment, the material in which the incisions are provided must have a good response to laser radiation, in order to prevent alterations of the nature of the layer in the melted areas from causing unwanted modifications of the properties of the film.

Likewise, a second multilayer film type is provided with regions preset for tearing that are constituted by a plurality of holes, which are likewise through holes.

Differently from the continuous incisions, the holes provide better protection of the underlying aluminum layer, but do not eliminate the problem of its exposure to the external environment and do not guide tearing in a linear fashion.

A third type of multilayer film for easy-open wrappers is also known in which the region preset for tearing is formed by a plurality of substantially parallel cuts that do not pass through completely, are mutually close and distributed in a substantially random manner.

Although these cuts, by not being through cuts, ensure protection of the underlying aluminum layer, their random distribution does not ensure that tearing proceeds along the wrapper easily or along a substantially rectilinear path.

Further, said cuts, if obtained by abrasion or mechanical punching, can entail a dangerous increase in the mechanical fragility of the material.

DISCLOSURE OF THE INVENTION

The aim of the present invention is to provide a multilayer laminated film, particularly for easy-open wrappers, that solves the problems and drawbacks revealed by known types of film.

Within this aim, an object of the present invention is to provide a multilayer laminated film that ensures substantially rectilinear propagation, in the intended direction, of the tearing of the wrapper in the appropriately weakened region.

Another object of the present invention is to provide a multilayer laminated film in which the layer of metallic material is always protected from contact with the external environment.

Another object of the present invention is to provide a multilayer laminated film that can be torn as easily as known types of film.

A further object of the present invention is to provide a film that can be used in known types of packaging machine.

A still further object of the present invention is to provide a multilayer laminated film that can be manufactured cheaply with known systems and technologies.

This aim and these and other objects that will become better apparent hereinafter are achieved by a multilayer laminated film, particularly for easy-open wrappers, which is constituted by a first layer made of plastic material and by at least one second layer made of material chosen among plastic material, metallic material, paper-like material or equivalent materials, each layer being coupled to the adjacent layer by means of an intercalated layer of adhesive material, said multilayer laminated film being characterized in that it has, on at least one face of the more rigid layer of plastic material, a plurality of continuous, parallel, side-by-side incisions, which are suitable to facilitate a substantially rectilinear propagation of the tearing of said film, said incisions affecting partially the thickness of said more rigid layer and being obtained by removing material.

BRIEF DESCRIPTION OF THE DRAWINGS

Further characteristics and advantages of the present invention will become better apparent from the following detailed description of eight preferred but not exclusive embodiments thereof, illustrated by way of non-limiting example in the accompanying drawings, wherein.

WAYS OF CARRYING OUT THE INVENTION

Figure 1:
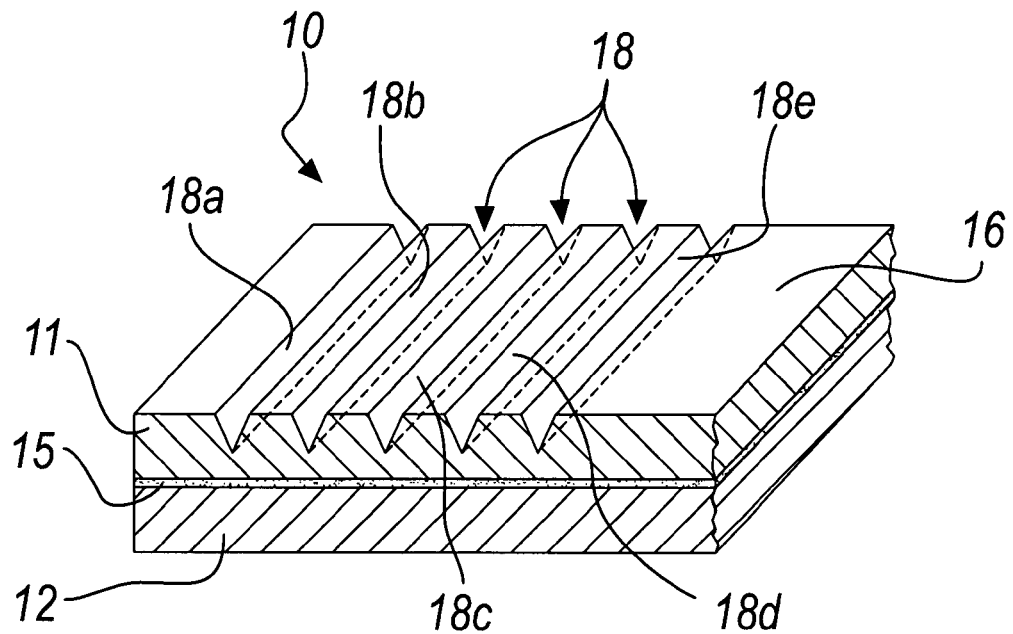
FIG. 1 is a perspective view of a portion of film according to the invention.
Figure 2:
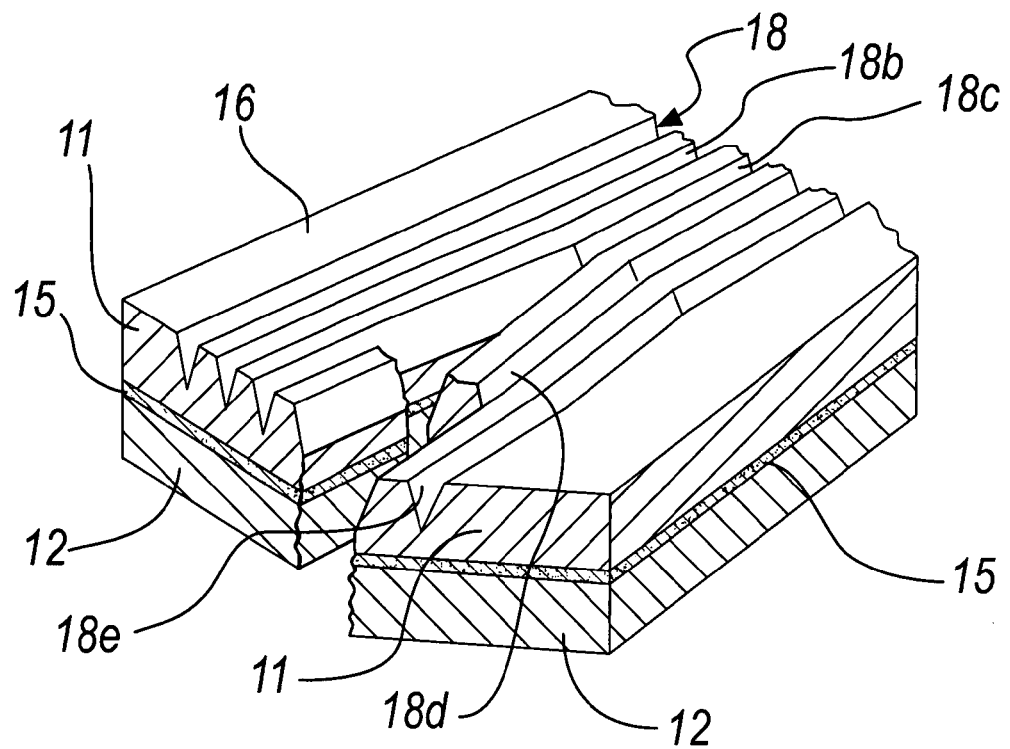
FIG. 2 is a perspective view of a portion of film according to the invention, partially torn.
Figure 3:
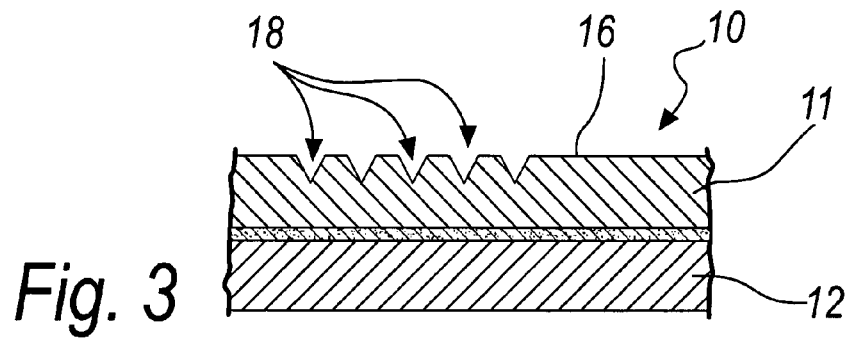
FIG. 3 is a sectional view of a film according to the invention in its first embodiment, also shown in FIGS. 1 and 2.

With reference to the figures, a multilayer laminated film, particularly for easy-open wrappers, according to the invention, is generally designated by the reference numeral 10 in its first embodiment, which is shown in FIGS. 1 to 3.

The film 10 is constituted by a first layer 11 made of plastic material and by a second layer 12 also made of plastic material.

The first layer 11, in this first embodiment, is made of oriented polypropylene (hereinafter oPP).

The second layer 12 is made of polyethylene (hereinafter PE).

The two layers are bonded by means of an intercalated layer 15 made of adhesive material.

The intercalated layer 15 is constituted selectively by a two-part adhesive or by extruded polyethylene.

The multilayer laminated film 10 has, on at least one face of the more rigid layer of plastic material, a plurality of continuous, parallel and side-by-side incisions 18.

The incisions are designated individually by the reference numerals 18a, 18b, 18c, 18d and 18e.

The incisions 18 are suitable to facilitate a substantially rectilinear propagation of the tearing of the film 10.

The incisions 18 partially affect the thickness of the more rigid layer.

In this first embodiment, the more rigid layer is the first layer 11, made of oPP.

In this embodiment, the incisions 18 are provided on the outer face 16 of the first layer 11.

The incisions 18 are obtained by removing material.

For the embodiments described here, the material removing operation is of the mechanical type.

Mechanical removal avoids problems in terms of alteration of the nature of the layer in melted areas and avoids the consequent unwanted risks of changes to the properties of the film.

The depth of the incisions 18, 18a, 18b, 18c, 18d and 18e is advantageously comprised in a range between 15 and 85% of the thickness of the layer 11 on which it is obtained.

Tests have in fact determined that below 15% the directionality of the tearing of the film is not satisfactory, whereas above 85% the mechanical properties of the laminated film 10 degrade importantly.

FIG. 2 illustrates by way of example the propagation of the tear in the film 10 following the application of a torque suitable to separate the film into two portions by pulling a first portion downward and to the right and the second portion upward and to the left, an action that is typically performed with one's fingers when tearing a wrapper in the appropriately provided easy-open regions.

The tear is triggered in the incision 18d and then continues in the incision 18c.

The parallel arrangement of the incisions 18 allows the tear to continue in a substantially rectilinear direction.

In a variation of the first embodiment, the first layer 11 is made of oriented polyester (hereinafter oPET) and the second layer 12 is made of polypropylene (hereinafter PP) or PE.

In this case, the material having greater rigidity characteristics is PET, and therefore the incisions 18 are obtained on one face of the first layer 11, in this case the outer face 16.

Figure 4:
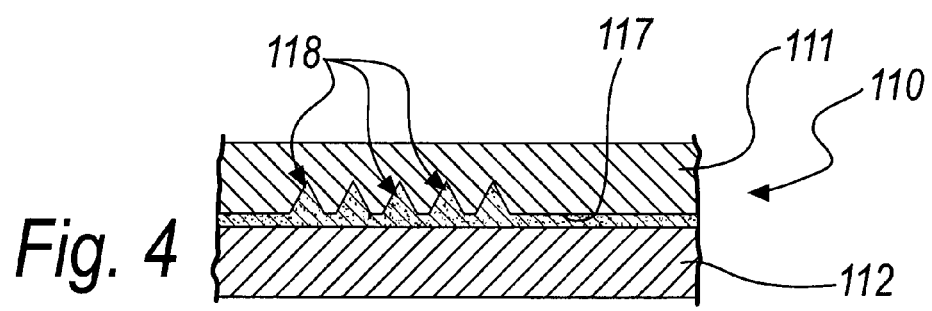
FIG. 4 is a sectional view of a film according to the invention in a second embodiment.

The second embodiment of FIG. 4 schematically illustrates a film 110 composed of a first layer 111 made of oPP and of a second layer 112 made of PE or PP.

The first layer 111, which is stronger, is provided with the incisions 118 on its internal face 117.

Figure 5:
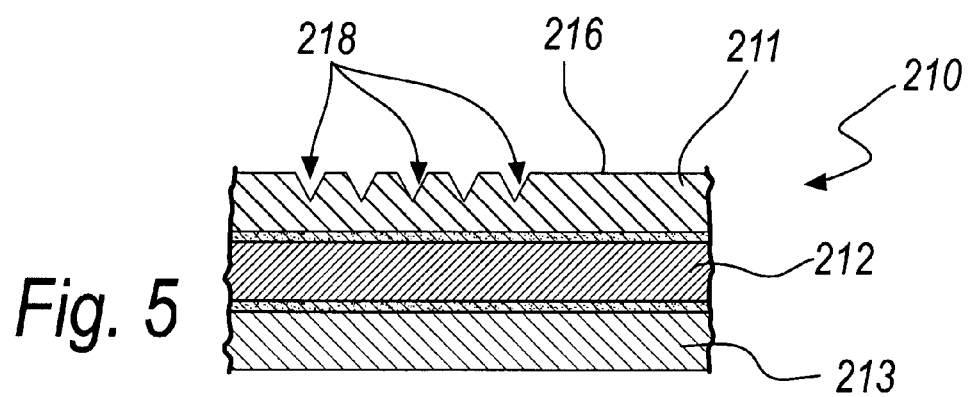
FIG. 5 is a sectional view of a film according to invention in a third embodiment.
Figure 6:
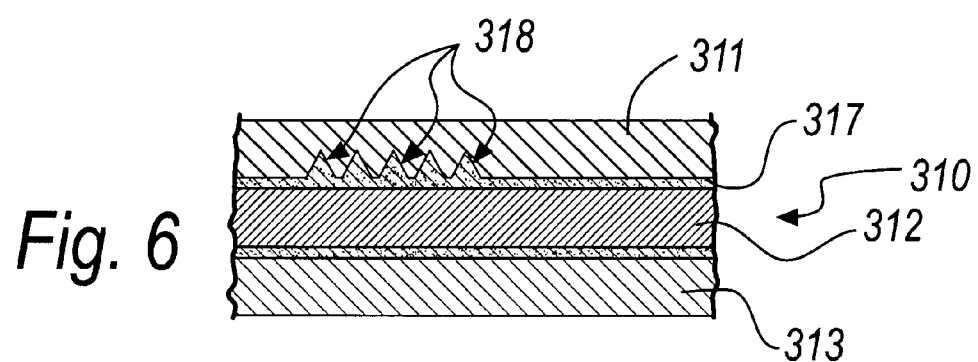
FIG. 6 is a sectional view of a film according to the invention in a fourth embodiment.

A third embodiment of the film according to invention, shown in FIG. 5, is provided with a first layer 211 made of oPP or PET, a second layer 212 made of aluminum, and a third layer 213 made of PE or PP.

The more rigid layer is the first layer 211 made of oPP or PET, and it is therefore on the outer face 216 of said first layer that the incisions 218 are provided.

Since the incisions 218 are not through incisions, they allow to protect the second layer of aluminum 212 from the external environment.

In the fourth embodiment of the invention described here, too, the film 310 is constituted by a first layer 311 made of oPP or PET, by a second layer 312 made of aluminum, and by a third layer 313 made of PE or PP.

The first layer 311 is provided with the incisions 318 on its internal face 317.

As before, in this case also the internal position of the incisions does not compromise the easy tearing of the film, since the layers that compose it always have a thickness on the order of tens of microns.

Figure 7:
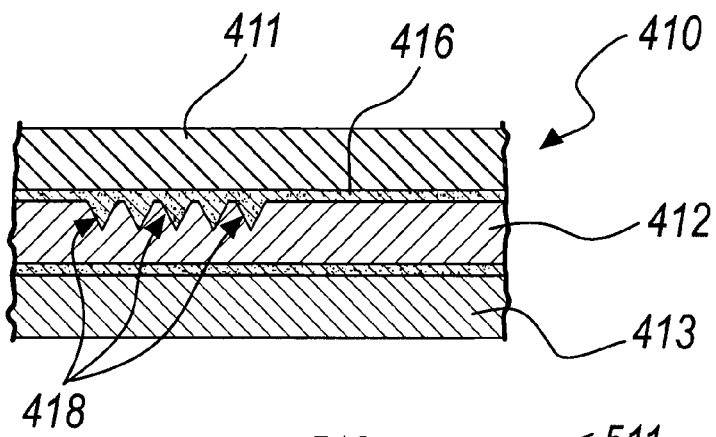
FIG. 7 is a sectional view of a film according to the invention in a fifth embodiment.
Figure 8:
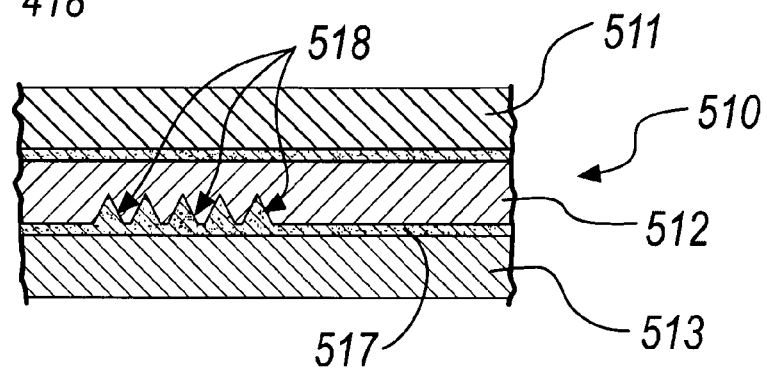
FIG. 8 is a sectional view of a film according to the invention in a sixth embodiment.

In a fifth embodiment, shown schematically in FIG. 7, the film 410 comprises a first layer 411 made of oPP or PET, a second layer 412 made of PET or orientated polyamide (oPA), and a third layer 413 made of PP or PE.

The most rigid layer is the second layer 412.

The incisions 418 are provided on its face 416 that is directed toward the first layer 411.

In a sixth embodiment, the film 510 is provided with a first layer 511 made of oPP or PET, with a second layer 512 made of PET or oPA, and with a third layer 513 made of PP or PE.

This time, the incisions 518 on the second layer 512 are provided on its face 517 that is directed toward the third layer 513.

It is sufficient to trigger the breakage of the most rigid layer, even if it is sandwiched between two other layers, in order to achieve tearing of the entire laminated film.

Figure 9:
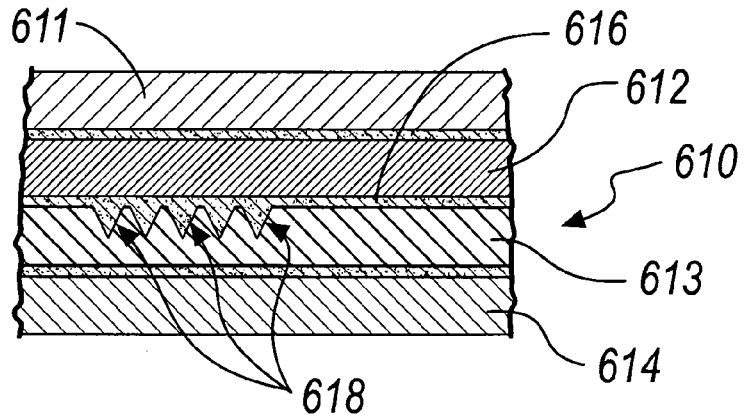
FIG. 9 is a sectional view of a film according to the invention in a seventh embodiment.
Figure 10:
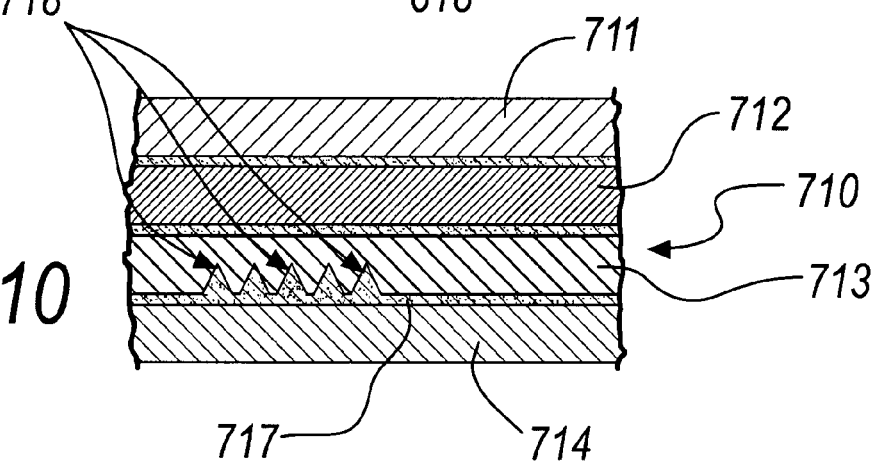
FIG. 10 is a sectional view of a film according to invention in an eighth embodiment.

In a seventh embodiment, shown schematically in FIG. 9, the film 610 is constituted by a first layer 611 made of PET, by a second layer 612 made of aluminum, by a third layer 613 made of orientated polyamide (oPA), and by a fourth layer 614 made of PP or PE.

Of the four layers provided here, the most rigid one is the third layer 613 made of oPA.

It is therefore the third layer 613 that bears the incisions 618, in this example on its face 616 that is directed toward the second layer 612 made of aluminum.

Likewise, in an eighth embodiment, the film 710 is again constituted by a first layer 711 made of PET, by a second layer 712 made of aluminum, by a third layer 713 made of oPA, and by a fourth layer 714 made of PP or PE, and is provided with the incisions 718 on one face of the third layer 713.

Differently from the previous embodiment, the face 717 provided with the incisions is the face directed toward the fourth layer 714 made of non-oriented polypropylene.

The invention also relates to a package that is characterized that it is provided by means of a multilayer laminated film according to one or more of the preceding claims and is provided with an easy-open region.

Such a package is highly appreciated in the field of sealing moist food, since it combines the qualities of food preservation with the qualities of simple and easy tearing of the opening and of the directional precision with which said opening occurs.

In practice it has been found that the invention thus described solves the problems described in known types of multilayer laminated film particularly for easy-open wrappers.

In particular, the present invention provides a multilayer laminated film that ensures a substantially rectilinear propagation of the tear in the intended direction of the wrapper in the appropriately weakened region.

Moreover, the present invention provides a multilayer laminated film, in which the layer made of metallic material is always protected against contact with the external environment.

Moreover, the present invention provides a multilayer laminated film that can be torn as easily as known types of film.

Moreover, the present invention provides a multilayer laminated film that can be produced cheaply with known systems and technologies.

The invention thus conceived is susceptible of numerous modifications and variations, all of which are within the scope of the appended claims; all the details may further be replaced with other technically equivalent elements.

In practice, the materials employed, so long as they are compatible with the specific use, as well as the dimensions, may be any according to requirements and to the state of the art.

The disclosures in Italian Patent Application No. PD2004A000302 from which this application claims priority are incorporated herein by reference.

What is claimed is:

1. A multilayer laminated film for packages, constituted by a first layer made of plastic material and by at least one second layer made of material chosen among plastic material, metallic material, paper-like material or equivalent materials, each layer being coupled to the adjacent layer by means of an intercalated layer of adhesive material, said multilayer laminated film having, on at least one face of the more rigid layer of plastic material, a plurality of continuous, parallel, side-by-side incisions, which are suitable to facilitate a reduction of the breaking load at right angles to the direction of the incisions, said incisions affecting partially the thickness of said more rigid layer and being obtained by removing material by means of a mechanical operation, the thickness of said more rigid layer, at said incisions, being reduced with respect to the thickness of said more rigid layer outside said incisions, with intrinsic nature of the material of said more rigid layer material being unaltered, wherein said depth of the incisions is in a range between 15 and 85% of the thickness of the layer on which it is provided.

2. The laminated film of claim 1, wherein said intercalated layer is made of two-part adhesive material.

3. The laminated film of claim 1, wherein said intercalated layer is made of extruded polyethylene.

4. The multilayer laminated film of claim 1, wherein said first layer is made of oriented polypropylene, said second layer is made of polyethylene or polypropylene, said first layer being provided with said incisions on its outer face.

5. The multilayer laminated film of claim 1, wherein said first layer is made of oriented polyester and said second layer is made of polypropylene or polyethylene, said first layer being provided with said incisions on its outer face.

6. The multilayer laminated film of claim 1, wherein said first layer is made of oriented polypropylene and said second layer is made of polyethylene or polypropylene, said first layer having said incisions on its internal face.

7. The multilayer laminated film of claim 1, wherein said first layer is made of oriented polypropylene or oriented polyester, said second layer is made of aluminum, and further comprising a third layer made of polyethylene or polypropylene, said first layer being provided with said incisions on its outer face.

8. The multilayer laminated film of claim 1, wherein said first layer is made of oriented polypropylene or oriented polyester, said second layer is made of aluminum, and further comprising a third layer made of polyethylene or polypropylene, said first layer being provided with said incisions on its internal face.

9. The multilayer laminated film of claim 1, wherein said first layer is made of oriented polypropylene or polyester, said second layer is made of oriented polyamide or polyester, and further comprising a third layer made of polypropylene or polyethylene, said second layer being provided with incisions on its face directed toward said first layer.

10. The multilayer laminated film of claim 1, wherein said first layer is made of oriented polypropylene or polyester, said second layer is made of oriented polyamide or polyester, and further comprising a third layer made of polypropylene or polyethylene, said second layer being provided with said incisions on its face that is directed toward said third layer.

11. The multilayer laminated film of claim 1, wherein said first layer is made of oriented polyester, said second layer is made of aluminum, and further comprising a third layer made of oriented polyamide, and a fourth layer made of polypropylene or polyethylene, said third layer being provided with said incisions on its face that is directed toward said second layer made of aluminum.

12. The multilayer laminated film of claim 1, wherein said first layer is made of oriented polyester, said second layer is made of aluminum, and further comprising a third layer made of oriented polyamide, and a fourth layer made of polypropylene or polyethylene, said third layer being provided with said incisions on its face that is directed toward said fourth layer.

13. The film of claim 1, wherein said material removing operation is of the mechanical type.

14. A package provided by means of a multilayer laminated film according to claim 1, having an easy-open region.

15. A method of manufacturing a multilayer laminated film for packages as claimed in claim 1, comprising the steps of:
arranging a first layer made of plastic material;
arranging at least one second layer made of material chosen among plastic material, metallic material, paper-like material or equivalent materials;
coupling each layer to the adjacent layer by means of an intercalated layer of adhesive material;
providing, on at least one face of the more rigid layer of plastic material, a plurality of continuous, parallel, side-by-side incisions, which are adapted to facilitate a reduction of the breaking load at right angles to a direction of the incisions, said incisions affecting partially the thickness of said more rigid layer and being obtained by removing material by means of a mechanical operation, the thickness of said more rigid layer, at said incisions, being reduced with respect to the thickness of said more rigid layer outside said incisions, with intrinsic nature of the material of said more rigid layer material being unaltered.

* * * * *